United States Patent [19]

Kissell

[11] Patent Number: 4,490,927
[45] Date of Patent: Jan. 1, 1985

[54] APPARATUS FOR CURING FIBROUS MINERAL INSULATION MATERIAL

[75] Inventor: Ronald E. Kissell, Alexandria, Ohio
[73] Assignee: Owens-Corning Fiberglas Corporation, Toledo, Ohio
[21] Appl. No.: 374,584
[22] Filed: May 3, 1982
[51] Int. Cl.³ .............................................. F26B 13/02
[52] U.S. Cl. ....................................... 34/155; 34/207; 34/242
[58] Field of Search ................. 34/242, 207, 208, 155, 34/216, 217; 432/242

[56] References Cited

U.S. PATENT DOCUMENTS

| 2,590,757 | 3/1952 | Cornelius, Jr. et al. | 34/216 |
| 3,069,786 | 12/1962 | Nichols, Jr. | 34/216 |
| 3,828,445 | 8/1974 | Smoot | 34/242 |
| 4,192,516 | 3/1980 | McCort | 34/207 |

Primary Examiner—Larry I. Schwartz
Attorney, Agent, or Firm—Ronald C. Hudgens; Philip R. Cloutier; Ted C. Gillespie

[57] ABSTRACT

Apparatus for curing fibrous mineral insulation material comprises an oven, upper and lower conveyor belts for carrying the insulation through the oven, support means for supporting the belts, a supply plenum for directing curing gases through the belts and the insulation material, an exhaust plenum for receiving the curing gases, and a baffle positioned within the oven to define a curing gas flow path from the supply plenum through the belts and the insulation material to the exhaust plenum, the flow path being spaced apart from the support means to prevent contact between the curing gases and the support means.

9 Claims, 2 Drawing Figures

APPARATUS FOR CURING FIBROUS MINERAL INSULATION MATERIAL

TECHNICAL FIELD

This invention pertains to apparatus for curing fibrous mineral material in an oven. More particularly, this invention relates to apparatus for directing curing gases through a fibrous mineral insulation material as the material is passed through an oven in order to cure the binder on the insulation material. In one of its more specific aspects, this invention relates to apparatus for defining a flow path for the curing gases within the curing oven.

BACKGROUND OF THE INVENTION

It is common practice in the manufacture of mineral fiber insulation to pass the insulation between a pair of foraminous conveyors, or belts, mounted for travel through the curing oven. Hot gases are passed through the insulation to more effectively cure the binder in the insulation. Associated with the oven are supplies of hot curing gases, usually air, which travel generally upwardly or downwardly through the insulation. Typically, the curing ovens are divided into zones, and flexible seals are sometimes employed to prevent the passage of curing gases from one zone to an adjacent zone. A common construction for the belts is that of foraminous flights connected in series and driven by a chain. The ends of the flights are mounted on wheels which ride in tracks running the length of the oven.

One of the problems associated with ovens for curing mineral fibers is that the support means for the belts, which can include the wheels and the chains, are subjected to a hostile environment due to the high temperature of the hot curing gases. Typically, the gases reach temperatures as high as 500° F. The moving parts in the form of wheel bearings and flexible chain linkages for pulling the flights through the oven require lubrication, and the lubricants themselves often react adversely in the hot oven environment. The heat of the curing gases can cause the lubricant to dry up, resulting in friction wear of the moving parts. Also, some of the lubricants oxidize, creating smoke which can become a source of air pollution.

Heretofore, the only means for preventing lubricant burn off and subsequent smoke generation and premature equipment wear, was to use costly specialty lubricants able to withstand the hot environment of a curing oven. The use of such high temperature lubricants has been only marginally satisfactory in performance, and has resulted in a greater operating expense in the manufacturing process.

Another problem associated with mineral fiber curing ovens is that although the general flow of curing gases through the oven is in the vertical direction, through the insulation material, it is believed that a substantial portion of the curing gases are flowing around the edges of the material and the belts, rather than through the material. For example, it is believed that a pressure drop from the top of the oven to the bottom equivalent to about 15 inches of water results in a pressure drop across the insulation material of only 2 to 3 inches of water. Thus, considerable inefficiencies can be involved with existing curing processes since much of the heated curing air is by-passing the product which is to be cured.

There has now been developed apparatus for curing fibrous mineral insulation material which overcomes the problems of existing ovens by providing baffles within the ovens to define a curing gas flow path which is through the belts and the insulation material, but which flow path is spaced apart from the wheels and the drive chain which support and move the belts through the oven. By employing the apparatus of the invention the chain and support mechanism including the wheels can be lubricated with a less costly and more reliable lubricant. A reduction in the burning off of the lubricant can substantially reduce the downtime required to fix the chains and other apparatus damaged by friction. Also, the apparatus of the present invention ensures that any smoke which is generated during the curing process is kept within the flow path, rather than being allowed to circulate throughout the curing oven, and potentially leaking out from the oven into the plant space.

SUMMARY OF THE INVENTION

According to this invention there is provided apparatus for curing fibrous mineral insulation material comprising an oven, upper and lower belts mounted for travel through the oven to carry the insulation material through the oven, support means positioned within said oven for supporting the belts, a supply plenum positioned on one side of the belts and adapted to direct curing gases through the belts and the insulation material, an exhaust plenum positioned on the other side of the belts for receiving the curing gases, and baffle means positioned within the oven and defining a curing gas flow path from the supply plenum to the exhaust plenum through the belts and the insulation materials, where the flow path is spaced apart from the support means to prevent contact between the curing gases and the support means.

In a specific embodiment of the invention the baffle means comprises seals which are mounted to maintain contact with the belts.

In another specific embodiment of the invention the baffle means comprises a seal carrier for mounting the seals, where the seal carrier is mounted for adjustment to facilitate continuous contact between the seals and the belts.

In a preferred embodiment of the invention the seal carrier is resiliently mounted.

In a more preferred embodiment of the invention the belts comprise upper and lower conveyors, each of said conveyors comprising a plurality of flights.

In another preferred embodiment of the invention the support means comprises wheels connected to the tabs of the flights, and tracks for supporting and guiding the wheels.

In the most preferred embodiment of the invention a chain is provided for moving the flights through the oven, the chain being positioned outside the flow path of the curing gases.

DESCRIPTION OF THE INVENTION

The invention will be described with reference to apparatus for curing fibrous glass insulation material, although it is to be understood that the invention can be practiced for curing other heat softenable mineral material such as rock, slag and basalt.

Figure 1:
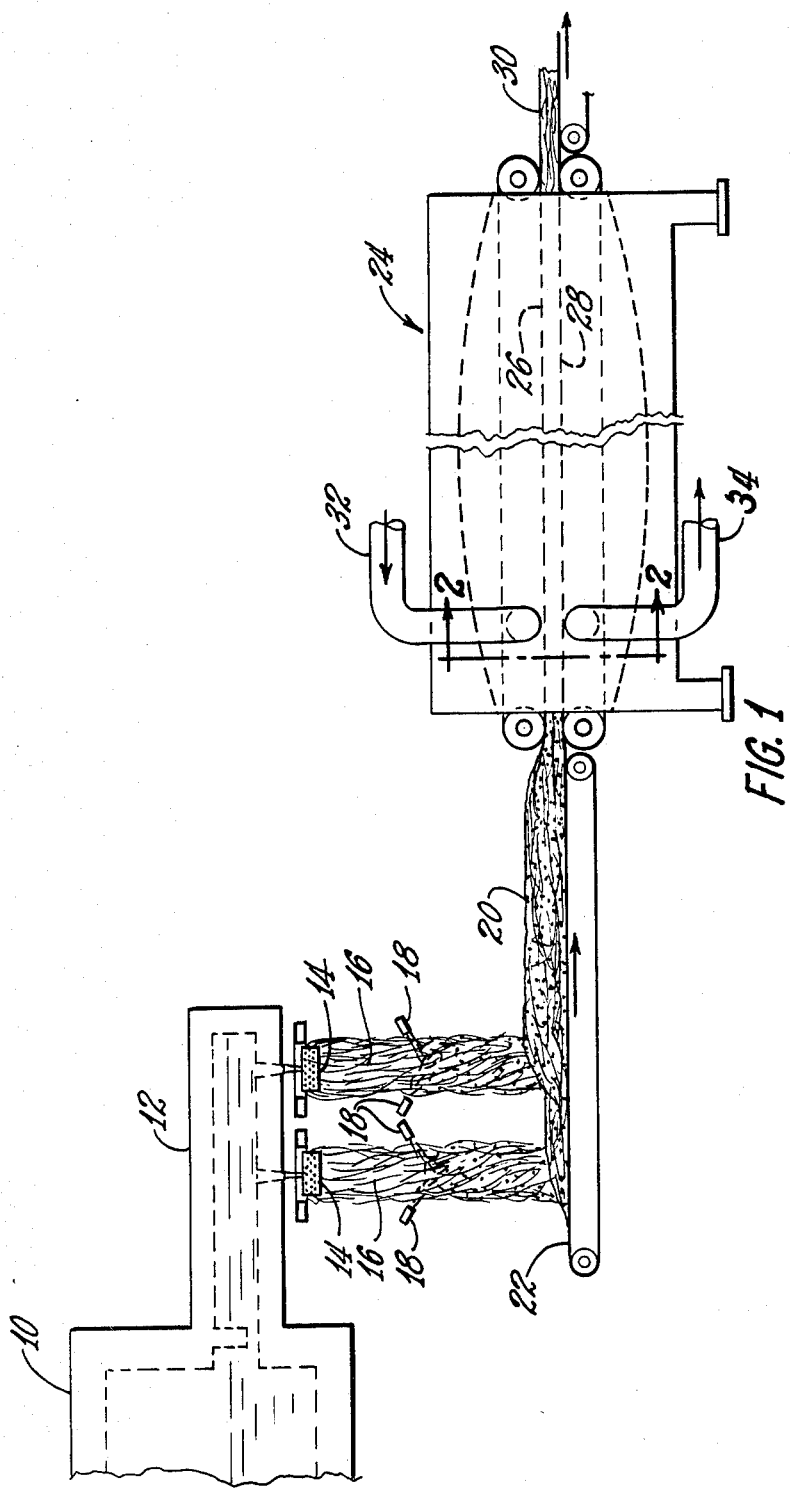
FIG. 1 is a schematic cross-section in elevation of the apparatus for curing fibrous mineral material according to the principles of this invention.

As shown in FIG. 1, molten glass is supplied from furnace 10 via forehearth 12 to fiberizers 14. Veils of fibers 16 produced by the fiberizers have binder sprayed thereon by binder applicators 18, and the fibers are collected as pack 20 on conveyor 2. The binder can be a phenol-formaldehyde binder, or any other type of binder. It is to be understood that the pack can be produced by alternate methods, many of which are known in the art. The uncured pack is then passed through oven 24 between upper belt 26 and lower belt 28 and emerges as cured product 30. The hot curing gases, such as hot air, for curing the binder can be supplied from a source, not shown, via hot curing gases supply duct 32 and can be removed from the oven via exhaust duct 34.

Figure 2:
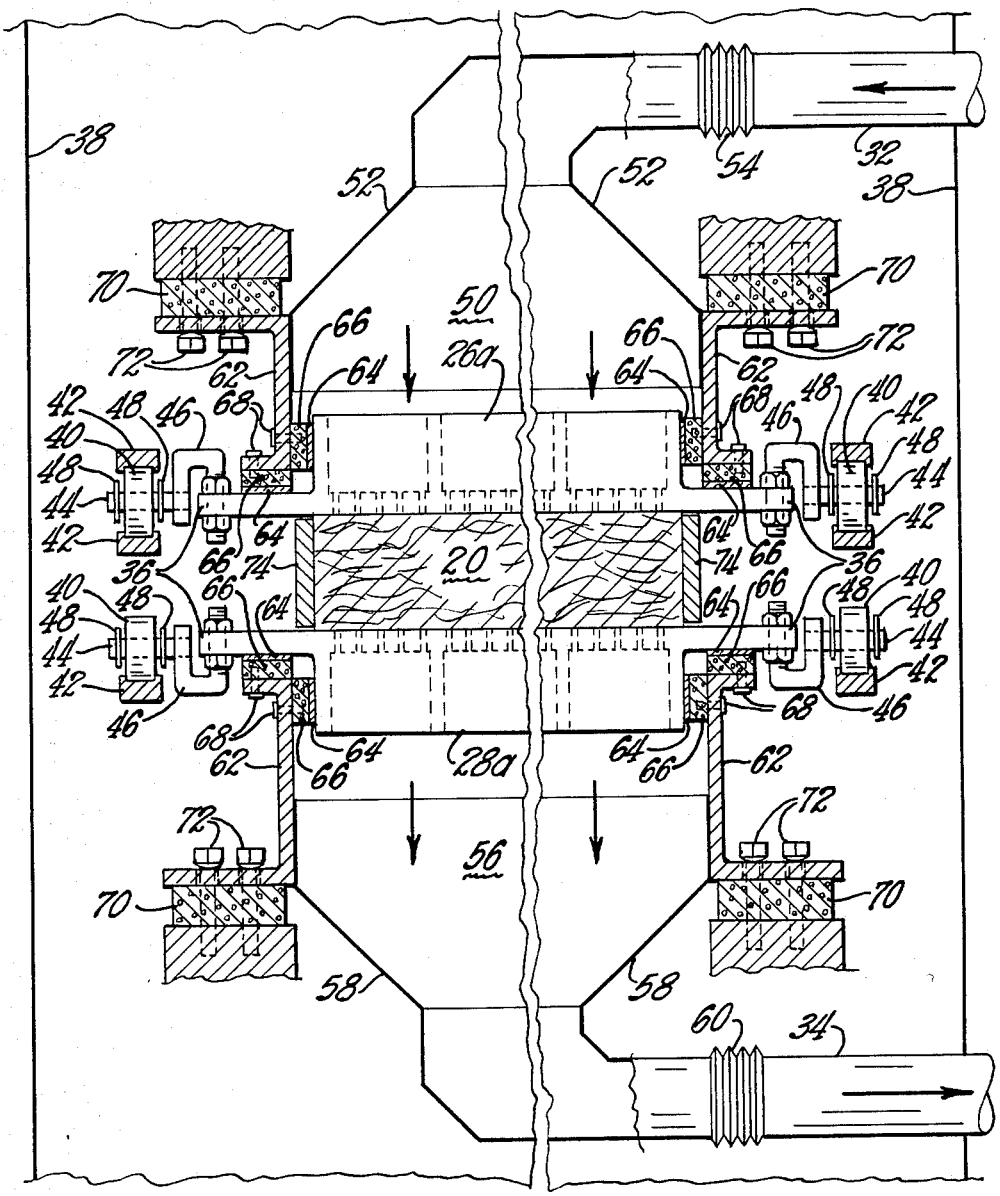
FIG. 2 is a section in elevation taken along line 2—2 of FIG. 1.

Any conveyor means suitable for carrying the uncured pack through the oven, while enabling the flow of curing gases through the pack, can be used for the belts. As shown in FIG. 2, the conveyor belts can be comprised of a plurality of flights, such as upper flight 26a and lower flight 28a. The flights can have elongated ends, such as flight tabs 36. Positioned within oven walls 38 are support means for supporting the flights. The support means can be comprised of wheels 40 riding in tracks 42 and connected via axles 44 to the flight tabs by U-shaped mounting brackets 46. The wheels and the flights can be pulled through the oven by any suitable means, such as chain 48. The chain and the wheels require lubrication to prevent friction of the moving parts.

Positioned on one side of the flights, such as on the top side of the upper flight as shown in FIG. 2, is supply plenum 50 defined by supply plenum walls 52. The supply plenum is supplied with hot curing gases from the supply duct. The supply duct can be adapted with flexible connection 54 to facilitate the raising and the lowering of the flights and the supply plenum to accommodate different thicknesses of insulation packs. Positioned on the other side of the flights, such as on the bottom of the lower flight as shown in FIG. 2, is exhaust plenum 56 defined by exhaust plenum walls 58, and connected via flexible section 60 to the exhaust duct. Alternatively, the apparatus can define an upwardly moving flow of curing gases, while still practicing the invention.

Positioned within the oven are baffle means, such as seal carrier 62, which define a curing gas flow path from the supply plenum to the exhaust plenum through the belts and through the insulation material. It can be seen that the flow path for the curing gases defined by the seal carrier is spaced apart from the wheel, the chain, and the mounting bracket linking the wheel to the flight tab, thereby preventing contact between the curing gases and these elements of the support means. The seal carrier can be adapted with seals 64 which are mounted to the seal carrier via seal mounting blocks 66 and seal mounting bolts 68. The seals are mounted to remain stationary relative to the flights and to maintain contact with the flights, as the flights move through the oven. The seals can be made of any material suitable for low friction, sliding contact, such as a Teflon material.

The seal carrier can be mounted on resilient material 70 with adjustment bolts 72 to enable vertical adjustment of the seal carrier. Also, by uneven adjustment of the adjustment bolts, horizontal adjustment of the seal carrier can be effected. Uneven adjustment of the adjustment bolts causes the seal carrier to be cantilevered horizontally at its upper end.

One or both of the flights can be adapted with side guides 74 which facilitate the curing process by preventing curing gases from escaping from the flow path via the sides of the insulation pack. The side guides can also be adapted to mold desired configurations such as shiplap edges into the edges of the insulation product.

It will be evident that various modifications can be made to this invention. Such, however, are considered as being within the scope of the invention.

I claim:

1. Apparatus for curing fibrous mineral insulation material comprising:
   a. an oven;
   b. upper and lower belts mounted for travel through said oven to carry the insulation material through said oven;
   c. support means positioned within said oven for supporting said belts;
   d. a supply plenum positioned on one side of said belts and adapted to direct curing gases through said belts and the insulation material;
   e. an exhaust plenum positioned on the other side of said belts for receiving said curing gases, and
   f. baffle means positioned within said oven and defining a curing gas flow path from said supply plenum to said exhaust plenum exclusively through said belts and the insulation material, said flow path being spaced apart from said support means to prevent any contact between said curing gases and said support means.

2. The apparatus of claim 1 in which said baffle means comprises seals which are mounted to maintain contact with said belts.

3. The apparatus of claim 2 in which said baffle means comprises a seal carrier for mounting said seals, said seal carrier being mounted for adjustment to facilitate continuous contact between said seals and said belts.

4. The apparatus of claim 3 in which said seal carrier is resiliently mounted.

5. The apparatus of claim 4 in which said belts comprise upper and lower conveyors, each of said conveyors comprising a plurality of flights.

6. The apparatus of claim 5 in which said support means comprises wheels connected to the tabs of said flights, and tracks for supporting and guiding said wheels.

7. The apparatus of claim 6 comprising a chain for moving said flights through said oven, said chain being positioned outside said flow path.

8. Apparatus for curing fibrous mineral insulation material comprising
   a. an oven;
   b. upper and lower conveyor belts mounted for travel through the oven to carry the insulation material therethrough, said upper and lower belts comprising a plurality of foraminous oven flights;
   c. support means positioned within the oven for supporting the flights, said support means comprising wheels adapted to travel in a track, brackets for mounting said wheels to said flights, and a chain linking the wheels of adjacent flights and adapted to drive the flights through the oven;
   d. a supply plenum positioned on one side of the flights and adapted to direct curing gases through the flights and the insulation material;

e. an exhaust plenum positioned on the other side of the flights for receiving the curing gases;

f. a seal carrier positioned within the oven to define a curing gas flow path from the supply plenum to the exhaust plenum exclusively through the belts and the insulation material, said flow path being spaced apart from said support means to prevent any contact between said curing gases and said support means; and g. a plurality of seals mounted on said seal carrier to maintain contact with said flights.

9. The apparatus of claim 8 comprising side guides mounted on said flights to prevent the flow of gases through the side edges of said insulation material.

* * * * *